June 20, 1933.  E. E. HEWITT  1,914,600

FLEXIBLE GASKET

Filed Aug. 6, 1931

INVENTOR.
ELLIS E. HEWITT
By *Wm. M. Cady*
ATTORNEY.

Patented June 20, 1933

1,914,600

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLEXIBLE GASKET

Application filed August 6, 1931. Serial No. 555,404.

This invention relates to flexible diaphragms of the type made chiefly of a rubber composition and adapted to be clamped at the outer edge and which is flexed in service to accomplish various purposes.

The rubber composition heretofore used in flexible diaphragms of the above type has been of a fairly soft and resilient nature to provide the diaphragm with the desired flexibility. It has been found in practice that, due to this, the outer edge portion of the diaphragm has a tendency to creep from between the clamping members when the diaphragm is subjected to pressure. Such creepage is objectionable in that it might result in the buckling of the diaphragm, leakage of fluid past the diaphragm and undue wear of the diaphragm and thus impair the efficiency of the diaphragm.

The principal object of my invention is to provide an improved flexible diaphragm of the above type which will have the desired flexibility and yet be free from the above mentioned objectionable features.

This object I accomplish by making a face of the portion of the diaphragm, which is adapted to be engaged by one of the clamping members, of a sufficiently less resilient nature than that of the rest of the diaphragm as to effectively prevent creepage of the diaphragm when the diaphragm is clamped in place and subjected to load.

Figure 1:
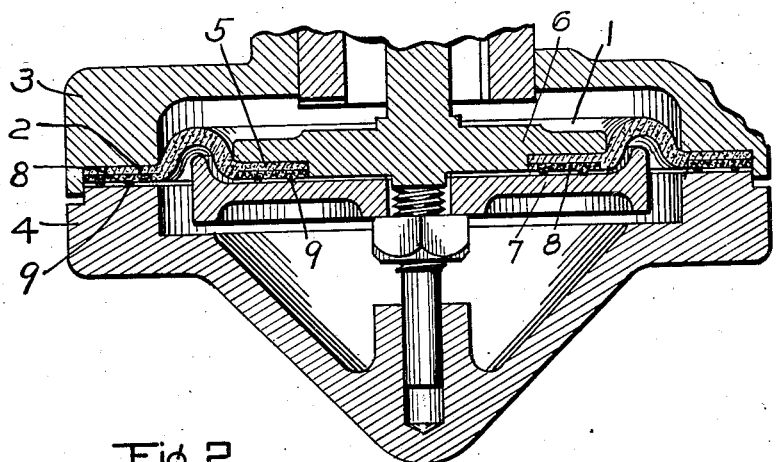
Figure 2:
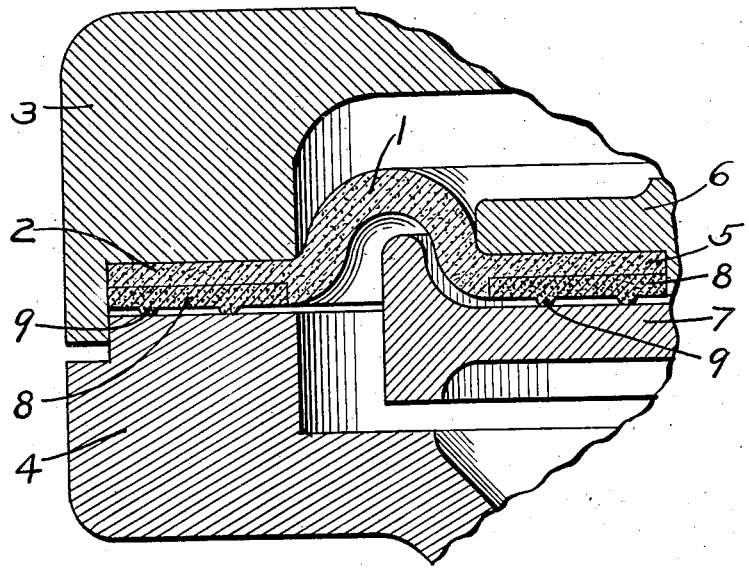

In the accompanying drawing Fig. 1 is a fragmentary sectional view through a device showing my improved flexible diaphragm mounted therein and Fig. 2 is an enlarged fragmentary detail sectional view of the same.

According to my invention, the greater part of the flexible diaphragm 1, as shown in the drawing, comprises a disk of fairly soft and resilient rubber composition having an outer annular flange 2 adapted to be clamped between clamping members 3 and 4 and also having an inner clamping flange 5 or web adapted to be clamped between a follower 6 and a clamping plate 7 of a movable abutment.

The annular flange 2 for a portion of its thickness consists of a rubber composition 8 which is less resilient than that of the major portion of the diaphragm and has a clamping face 9 which is engaged by the clamping member 4. The composition 8 is of such a nature that when the flange 9 is clamped between the clamping members 3 and 4 it will not stretch or become deformed when the diaphragm is loaded and thus forms a stiffening member which effectively resists the tendency of the diaphragm to creep from between the clamping members 3 and 4.

As shown in the drawing, a clamping face of the flange 5 may also be made of the rubber composition 8 to prevent creepage of the flange from between the follower 6 and plate 7.

In practice the composition 8 will preferably be inset in the more resilient composition and will be integrally united therewith.

While I have shown and described the clamping faces of one side of the diaphragm as being composed of the rubber composition 8, it will be understood that the clamping faces of the other side may be made of the same composition.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A flexible diaphragm comprising a disk of resilient material, and a stiffening member for the diaphragm embedded in said material forming an exposed clamping face of the diaphragm.

2. A flexible diaphragm comprising a disk of resilient rubber composition and a stiffening member for the diaphragm embedded in said rubber composition forming an exposed clamping face for the diaphragm.

3. A flexible diaphragm comprising a disk of resilient rubber composition and a stiffening member for the diaphragm embedded in said rubber composition forming a clamping face for the diaphragm, said stiffening member being composed of a rubber composition having less resiliency than the composition of said disk.

In testimony whereof I have hereunto set my hand, this 4th day of August, 1931.

ELLIS E. HEWITT.